June 22, 1954     O. J. POUPITCH     2,681,679
NUT CAGE
Filed March 9, 1950
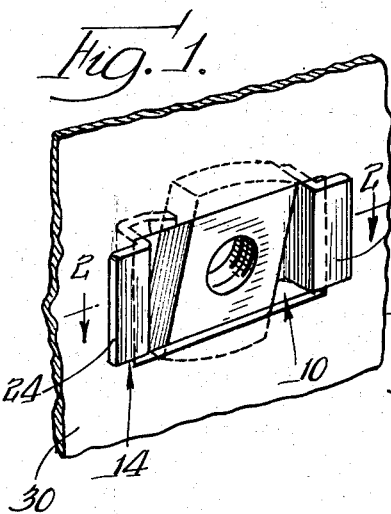
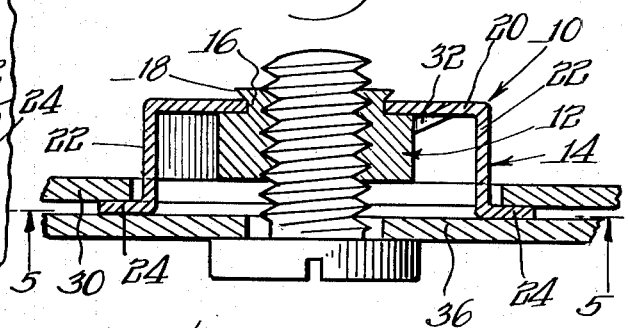
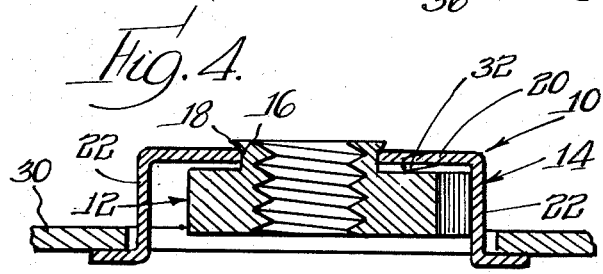
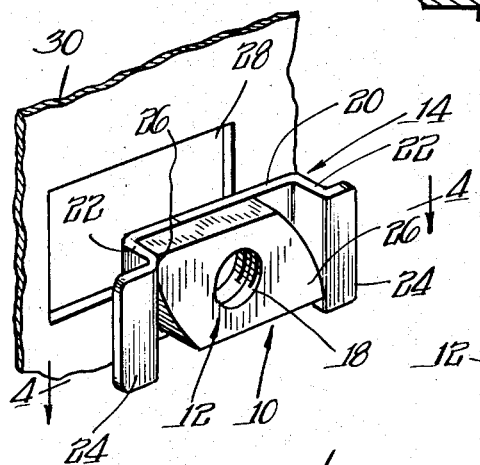
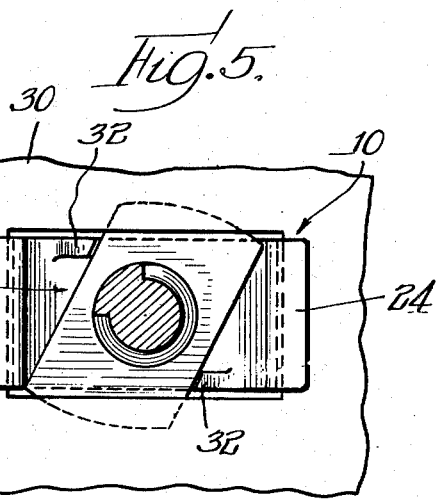
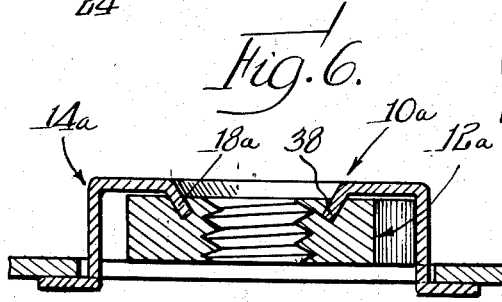
INVENTOR.
Ougljesa Jules Poupitch
BY
Moore, Olson & Trexler
attys.

Patented June 22, 1954

2,681,679

UNITED STATES PATENT OFFICE 2,681,679

NUT CAGE

Ougljesa Jules Poupitch, Chicago, Ill., assignor to Illinois Tool Works, Chicago, Ill., a corporation of Illinois Application March 9, 1950, Serial No. 148,558

2 Claims. (Cl. 151—41.76)

This invention relates generally to fastener units and more particularly to preassembled nuts and retainers therefor designed for permanent attachment within an aperture of a work piece or sheet.

It is an object of the present invention to provide a fastener unit of extremely simple and practical construction consisting of a nut and a sheet metal retainer or cage therefor wherein the constituent parts may be relatively rotated to effect permanent attachment within a complementary aperture of a work piece.

More specifically the invention is directed to a fastener unit as set forth above wherein a nut rotatably mounted upon a complementary sheet metal retainer may be housed within said retainer and inserted as a preassembled unit within the aperture of a work piece, the nut being thereafter rotatable to effect overlying of one side of the work piece by the nut and the opposite side of the work piece by the retainer member.

It is a further object of the present invention to provide a fastener unit consisting of a nut and a sheet metal retainer or cage therefor which unit may be applied to or inserted within a work aperture without the necessity of springing or flexing the cage member and to this end the invention contemplates rotatability of the nut within a sheet metal cage after telescopic association of the fastener unit with the work aperture.

The foregoing and other objects and advantages will be more apparent from the following detailed description when considered in connection with the accompanying drawing wherein—

Fig. 1 is a perspective view disclosing a fastener unit of the present invention applied to an apertured work sheet;

Fig. 2 is an enlarged, central, transverse, sectional view taken substantially along the line 2—2 of Fig. 1;

Fig. 3 is a perspective view disclosing the relative positions of the nut and retainer member constituting the fastener unit during initial association thereof with the aperture of a work piece;

Fig. 4 is a transverse, sectional view taken substantially along the lines 4—4 of Fig. 3 after the fastener unit of Fig. 3 has been completely inserted within the work aperture;

Fig. 5 is a front elevational view taken substantially along the line 5—5 of Fig. 2; and Fig. 6 is a sectional view similar to Fig. 4 disclosing a modified form of coupling between the nut and retainer member whereby the parts are relatively rotatable and secured against axial separation.

Referring now to the drawing, wherein like numerals have been employed to designate similar parts throughout the various figures, it will be seen that one embodiment of a fastener unit contemplated by the present invention is designated generally by the numeral 10. This fastener unit includes a nut member 12 and a sheet metal nut retainer 14. The nut retainer 14 may be produced from a strip of sheet metal stock and apertured to accommodate an annular protuberance 16 extending from one face of the nut member 12. The outer extremity of this protuberance is swaged or otherwise forced radially outwardly to provide a shoulder 18. In this manner the nut is relatively rotatable with respect to the sheet metal retainer 14 within given limits.

The aperture in the retainer for accommodating the annular nut protuberance 16 is formed in a plate section 20 which superimposes the outer surface of the nut. Spacing members 22 depend from the plate 20 and terminate in radially extending feet portions or flanges 24. It will be noted that the width of the portion of the retainer member intermediate the feet 24, namely the plate 20 and spacer members connected thereto is substantially equal to the width of the nut taken across its narrower width as clearly illustrated in Fig. 3. The nut is secured against further counterclockwise rotation with respect to the retainer member 14 by reason of the engagement of the corner portions 26 of the nut engaging with the inner surfaces of adjacent spacer members 22. Opposite corners of the nut 12 have been relieved or chamfered so as to permit clockwise rotation of the nut from the position shown in Fig. 3 to the position shown in Figs. 1 and 5.

With the constituent elements of the fastener unit occupying the position shown in Fig. 3, the portion of the nut retainer bounded by the plate 20 and the spacer members 22 may be telescopically associated or inserted within a complementally shaped rectangular aperture 28 in a work piece 30. The nut 12 may now be rotated to the position shown in Figs. 1 and 5, the engagement of the retainer stock within the aperture 28 serving to secure said retainer against rotation with respect to the work piece. As the nut 12 reaches the limit of its rotary displacement, fingers or abutments 32 depending from the plate 20 of the retainer member spring inwardly into latching relation with respect to the adjacent side surfaces of the nut and thereby secure the nut against inadvertent or unauthorized turning. Other devices such as dimples or the like may be employed with equal facility to function similarly to the fingers 32 in securing the nut in its attached or work overlying position. It will be noted that in this position opposite extremities of the nut overlie one surface of the work piece 30 and the radial feet or flanges 24 of the retainer member overlie the opposite surface of the work piece 30 in the vicinity of the aperture 28.

With the fastener unit secured in position upon the work piece 30 a complementary screw member 34 may be inserted through an aperture in a work piece 36 and tightened within the nut 12. Any tendency for the screw to withdraw the fastener unit from the work aperture 28 is resisted by the engagement of the overlying portions of the nut 12 and any tendency for the fastener unit to be forced in the opposite direction is resisted by the engagement of the feet 24 with the opposite surface of the work piece 30. If it is desired to have the fastener unit loosely mounted within the aperture 28 so as to permit lateral shifting within given limits within the aperture this may be accomplished by making the aperture slightly larger than the overall width and length of the retainer plate 20. To remove the fastener unit from the work piece 30 it is only necessary to depress the fingers 32 and apply a rotating force to the nut 12 from the position shown in Fig. 1 to that shown in Fig. 3. By rotating the nut to the position shown in Fig. 3, the fastener unit may be withdrawn from the aperture 28. It will therefore be apparent that the invention contemplates a very simple preassembled nut and sheet metal retainer which may be attached and detached with respect to an apertured work piece with a minimum amount of effort.

Fig. 6 discloses a slightly modified form of fastener unit designated generally by the numeral 10a. This fastener unit 10a is similar in all respects to the fastener unit 10 previously described with the exception of the means for rotatably coupling the nut and retainer which also serves to secure the parts against axial separation. The retainer member 12a of the fastener unit 10a is provided with an annular flange 38 which is frusto-conical in shape and is designed to be received by a complementary annular recess extending into the body of the nut 12a. After the flange 38 has been associated with this recess the stock of the nut positioned radially inwardly therefrom is swaged or forced into overlying relationship so as to provide a shoulder 18a. Thus the nut and retainer are rotatably coupled and also secured against axial separation. This type of coupling makes for neat appearance and avoids any protrusion beyond the outer surface of the retainer plate.

From the foregoing it will be seen that the present invention provides a fastener unit of simple and practical construction which is adapted to be attached to an apertured work piece or sheet by the simple expediency of relative rotation between the nut and sheet metal retainer after initial insertion within the work aperture. While certain details have been described herein, it will be understood that other modifications and changes may be made without departing from the spirit and scope of the appended claims.

The invention is hereby claimed as follows:

1. A fastener unit comprising an apertured sheet metal retainer member including a plate section and a pair of side sections formed integral with and extending laterally from opposed margins of said plate section, flange members extending laterally outwardly from the free margins of said side sections of the retainer member for engaging one surface of an apertured work piece, a solid nut member of substantial thickness having major and minor axes, said nut member on the surface opposite the clamping surface thereof being rotatably coupled with and superimposed by said plate section, said side sections of the retainer member overlying the periphery of the nut member, said nut member having a pair of opposed chamfered corners providing clearance to permit rotation of said nut relative to said side sections of said sheet metal retainer member in one direction to permit the clamping side of the nut to overlie the surface of a work piece oppositely disposed from the surface engaged by said flange members, and abutment means on said plate section adapted to coact with a side wall of said nut member to prevent retrograde rotation thereof relative to said retainer member after the nut has been shifted to fastening position with respect to said apertured work piece.

2. A fastener unit in accordance with claim 1 wherein said abutment means on said plate section consists of a struck out element which is in the path of rotation of the nut member but exposed to prevent retrograde rotation thereof when said nut member is shifted to fastening position.

References Cited in the file of this patent

UNITED STATES PATENTS

| Number | Name | Date |
|---|---|---|
| 638,564 | Davies | Dec. 5, 1899 |
| 890,285 | Krantz | June 9, 1908 |
| 1,315,160 | Ross | Sept. 2, 1919 |
| 1,744,488 | Mitchell | Jan. 21, 1930 |
| 1,820,667 | Leyes | Aug. 25, 1931 |
| 1,878,579 | Gober | Sept. 30, 1932 |
| 1,924,695 | Olson | Aug. 29, 1933 |
| 1,985,333 | Wiley | Dec. 25, 1934 |
| 2,255,649 | Burke | Sept. 9, 1941 |
| 2,326,285 | Burke | Aug. 10, 1943 |
| 2,369,865 | Spencer | Feb. 20, 1945 |
| 2,381,233 | Summers | Aug. 7, 1945 |